2,847,067
STERILIZATION INDICATOR

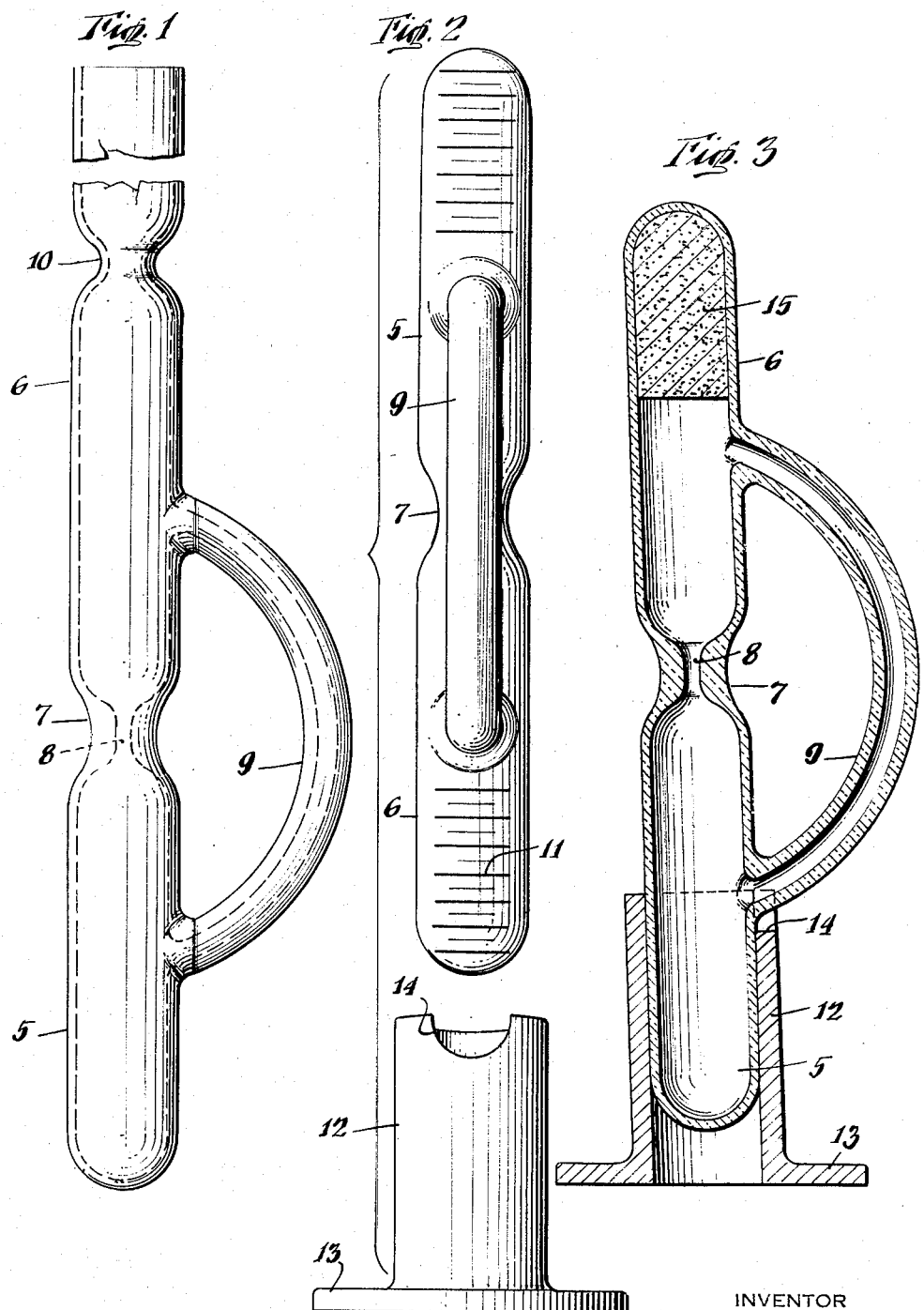

John H. Brewer, Towson, Md., assignor to Hynson, Westcott & Dunning, Inc., Baltimore, Md., a corporation of Maryland Application September 1, 1955, Serial No. 531,871

1 Claim. (Cl. 161—15)

This invention relates to a functionally and structurally improved sterilization indicator as well as a method of manufacturing the same.

This application is a continuation in part of my prior application for United States Letters Patent, entitled, "Time-At-Temperature Device," filed in the Patent Office on October 6, 1952 and identified under Serial No. 313,320 and now abandoned.

It is a primary object of this invention to provide an indicator which may readily be employed by an operator in a manner such that he is assured articles within an autoclave or similar receptacle will have been properly sterilized.

A further object is that of teaching a method of manufacturing an indicator of this type which method may be practiced by following quantity production techniques such that the resultant unit will be produced at minimum cost.

With these and other objects in mind, reference is had to the attached sheet of drawings illustrating one practical embodiment of the invention, and in which:

Fig. 1 is a somewhat diagrammatic view of the integral parts of the device and showing the method of manufacturing the latter;

Fig. 2 is an exploded side elevation of the assembly providing the indicator; and Fig. 3 is a longitudinal sectional view through the parts and showing them in assembled condition.

In connection with sterilization techniques, considerable concern has been experienced in determining whether or not they have been properly carried out. Having in mind this difficulty, indicators have been placed on the market and which are to be associated with an autoclave or other receptacle, the contents of which is to be sterilized. Except for continuous reading electric thermocouples, many of these indicators show only that the temperature desired has been reached. The new types of autoclaves are usually well equipped with automatic time and temperature controls. However, the arrangement of the materials disposed within the autoclave will determine the actual time and temperature required for sterilization and the controls cannot be adequately pre-adjusted to take into account the widely varying conditions of use in the laboratory.

Where apparatus of this type is equipped with thermocouples and recording instruments, they may, of course, be placed in various localities within the receptacle. However, for the most part, only a few leads are available and one cannot resort to an arrangement where a great number of these recording thermocouples are arranged throughout the load, because of the expense involved. Material presenting especial difficulties embraces, for example, a group of towels or cloths disposed within the sterilizing receptacle. Also, experiments conducted with solutions have shown that where these are disposed in a receptacle, that despite care used in heating the latter uniformity did not result. Rather, the heating of the solution occurred in a layering manner with the space above the solution heated to the greatest extent, the upper zone of the solution heated to a lesser extent and the lowermost zone embodying a still more reduced temperature.

By means of the present teachings, an indicator is provided which will be relatively inexpensive and will require no special skill in its use. The device will be compact and readily disposable in an autoclave or other sterilizing receptacle. Numbers of the devices may be disposed throughout a mass of material arranged within the receptacle; observation of the several indicators and their operation assuring that complete sterilization of the receptacle contents has been achieved. Also, devices constructed in accordance with the present teachings may be employed in connection with solutions and vapors with equal assurance that desired temperatures have been reached and maintained for adequate periods of time to assure satisfactory results. In fact, by following the present teachings, an economical and reliable indicator is provided for use in connection with a hot-air oven of the type employed for heat-sterilization.

Referring primarily to Fig. 1, a tube is shown which, by means of heat and suitable manipulation, provides compartments or receptacles 5 and 6, the interiors of which are connected by a neck portion 7 of reduced diameter. Within that portion, a bore 8 is formed which is cylindrical throughout the major portion of its length to provide, in effect, a metering plug structure. The inner faces of the adjacent ends of receptacles 5 and 6 may be contoured to furnish leading surfaces merging into the bore 8. Intermediate their lengths, these receptacles are formed with openings connected to the ends of a vent or by-pass tube 9. All of these several parts are preferably formed to be integral with each other and of a suitable glass composition. The vent tube 9 furnishes an unrestricted passage between the receptacles and is connected to the latter at points preferably short of their centers.

As shown in this view, a unit will include the several portions afore described. Before providing a succeeding unit, the tube is restricted as at 10. In such restriction, there is still furnished space adequate for the introduction of a material as hereinafter traversed into receptacle 6. With the introduction of that material, the tube is sealed off in the zone of restriction 10 to furnish an assembly embracing receptacles of substantially equal capacity and maintained in axial alignment by the neck portion 7 with the bore 8 of that portion again in substantial alignment with the axes of the receptacles. Suitable precautions may be resorted to in order that the atmosphere within the assembly will not be unduly laden with moisture. After the unit has been sealed off within zone 10, a subsequent and identical unit is conveniently provided.

Ideal dimensions embodied in one indicator for use in connection with sterilization practices will embrace an over-all length of, for example, ninety-six millimeters. Each of the receptacles may be around forty-five millimeters in length and the connecting neck portion may embrace six millimeters. The ends of the vent tube or by-pass 9 will connect with receptacles 5 and 6 at points substantially around twenty-five millimeters from their outer ends. In other words, the axis of the bore of tube 9 will be closer to the inner ends of the receptacles than to their outer ends at each of the points at which it is connected to those receptacles. Obviously, the connection between this tube and the receptacles will be entirely tight and thus provide against the leakage of any air. The interior of the receptacle will be under substantially atmospheric pressure. The vent tube 9 will extend from the receptacles and be spaced from the assembly in a manner such that it conveniently provides a handle portion for the manipulation of that assembly. While various glass compositions might be employed, it is preferred to utilize a type of glass corresponding to "Pyrex No. 7740."

If desired, and as shown especially in Fig. 2, the outer faces of the receptacles may be provided with indicia in the zones intervening their outer ends and tube 9. This has been indicated at 11 and may include graduation marks in addition to other suitable legends, serial numbers, trademarks, etc. As also shown in the latter figure, a support is provided for the assembly. This will conveniently include a socket 12 mounted upon a stabilizing base 13. Within the edge of the tubular member providing the socket, a notch 14 is conveniently formed. The height of the socket will be such that it may receive the outer end of either receptacle 5 or 6 and with the tube 9 disposed in a manner such that its lower end rests within socket 14.

In this manner, the indicator assembly will not be capable of rotating with respect to the base. As shown especially in Fig. 3, socket 12 is inclined with respect to the vertical. The degree of inclination may be such that the receptacle portions 5 and 6 will have a common axis extending substantially eighty-five degrees with respect to the vertical. Tube 9 will project outwardly from socket 12 in its uppermost surface; i. e., that outer surface zone of the socket which is inclined rearwardly. Therefore, tube 9 will project from what might be termed the uppermost face of the assembly. Accordingly, its bore, at points adjacent those at which it communicates with the receptacles, will not be in a position such that material will flow from the receptacles 5 or 6 into that bore.

If chemicals remain pure, their melting points have always been acceptable as reliable indicators of temperature. It is apparent that by enclosing a proper chemical compound in a receptacle assembly, so constructed that it permits the flow of the molten material, one may determine the temperature as well as the length of time that the temperature remains constant. If, in this flow path, a metering plug structure or narrow constriction is present, the molten material will flow at a uniform speed. With a pair of receptacles, one to each side of the constriction and with air present within the assembly, then a by-pass provided between the receptacles will permit of a free air flow between them and assure equalization of pressure.

An ideal sterilizing temperature is 121° C. Many substances convert from solids to flowable liquids at this temperature. However, most of them will not be susceptible to being repeatedly reduced to a molten condition and flow with the same degree of viscosity at the same temperatures throughout an unlimited number of cycles, each ending with the material coagulating into a substantially solid mass.

Mandelic acid will melt at 120° C. However, on repeated meltings, the temperature is considerably lower. Thus, this material is entirely proper for a "one-time" use. However, having in mind that the present device should be susceptible to an unlimited number of repeated uses with complete assurance that the results desired obtain when the material has passed from an upper to a lower receptacle, mandelic acid should ordinarily not be employed.

I have found that proper material is succinic anhydride, OCOCH$_2$CH$_2$CO, mol. wt. 100.07. This will melt at 120° C. Also dl-mandelic acid, C$_6$H$_5$CHOHCOOH, mol. wt. 152.14, is satisfactory. In common with succinic anhydride, it has a melting point of 120° C. I have found that succinic anhydride remains constant in its ability to melt and flow repeatedly in that tests have shown that it would melt and flow at 120° C. to 121° C. in fifteen to seventeen minutes. These tests have also shown that at, for example, 118° to 119° C., two and one-half hours were required for the succinic anhydride to melt and flow. At 125° C., one gram of this material will flow to completely evacuate the upper receptacle in eight minutes. These time differences are generally comparable to sterilizing times.

As will be apparent, assemblies of the type described can be included in any desired number and dispositioned within the area of an autoclave or corresponding receptacle without detracting substantially from the available loading space. The units can be mounted in special holders and placed on shelves or suspended in the chamber in addition to being embedded within the mass of the material. They might, of course, be otherwise mounted. The indicators, being hermetically sealed, cannot contaminate any mass of material or solution with which they are in contact and need not be removed before transferring the sterilized product into a final container.

In the event that merely heat sterilization is to be resorted to as in the case of a hot-air oven, it will usually be desirable to employ an assembly of larger dimensions than those as afore indicated. Also a material should be employed which will have a higher melting point than succinic anhydride. It should for example embody 166° to 167° C. melting characteristics. I have found that p-phenyphenol is entirely satisfactory. With the parts properly proportioned and with the receptacles and neck portions thereof approximately three times those of the assemblies used under autoclaving techniques, such apparatus will check the hot-air sterilization for one hour at this temperature. It is apparent that under all circumstances, the units are comparatively quite inexpensive and may also be used by relatively small laboratories without resorting to recording thermocouples.

The material therefor introduced through the constriction 10, as in Fig. 1, will be of the nature afore described. The volume employed should be less than the distance between the outer end of one receptacle and the point of connection of tube 9 with that receptacle. For example, the material 15 may in its initially solidified condition have a depth of around twenty millimeters when the axes of the receptacles are disposed in a substantially vertical plane. It is apparent that by having socket 12 inclined with respect to the vertical and having by-pass tube 9 extend generally from the upwardly inclined side face of the assembly, that the solid material may convert to a liquid and flow downwardly from the uppermost receptacle through the neck portion 7 into the lowermost receptacle without diverting into the by-pass. Ordinarily, graduation marks such as 11 need not be employed in that the absence of any material 15 remaining within an uppermost receptacle will indicate that the sterilizing operation has been completed.

When so completed and after the return of the parts to a temperature lower than 120° C., the operator may reverse the receptacle assembly. To this end tube 9 is conveniently grasped and used as a handle. Receptacle 6 is withdrawn from socket 12 and by turning the unit through substantially 180°, receptacle 5 is aligned with socket 12. The material which has been deposited within receptacle 6 has solidified. Therefore, with this reversal of the parts it will be lodged within the uppermost portion of the chamber provided by receptacle 6. Again, tube 9 will rest within notch 14 or an equivalent positioning means when receptacle 5 is introduced into socket 12. The entire operation may now be repeated.

Thus, among others, the several objects of the invention as specifically aforenoted are achieved. Obviously numerous changes in construction and rearrangements of the parts may be resorted to. Also obviously, the steps of the method may be varied without departing from the spirit of the invention as defined by the claims:

I claim:

A sterilization indicator including in combination an integral glass assembly having in use a substantially vertical axis, said assembly comprising a pair of substantially identical receptacles having inner end portions, a neck connecting the inner end portions and presenting a fixed bore providing a metering orifice between such receptacles and a vent tube also extending between and having its ends in communication with the interiors of said receptacles at corresponding points intermediate the lengths of the latter, a mass of solidified material having a predetermined melting point disposed within the outer end of an upper receptacle at a zone above that at which the adjacent end of the vent tube is connected thereto, a support including a socket extending upwardly at an angle to the vertical, said socket receiving the outer end zone of the lowermost receptacle to maintain the indicator in a similar position, a notch formed in that face of the socket which is inclined rearwardly and faces outwardly and said notch receiving a portion of said vent tube to prevent rotation of said assembly with respect to said socket.

References Cited in the file of this patent

UNITED STATES PATENTS

| 1,245,923 | Jarmin | Nov. 6, 1917 |
| 1,260,979 | Jarmin | Mar. 26, 1918 |
| 1,670,002 | Pferdmenges | May 15, 1928 |
| 2,234,437 | Kistler | Mar. 11, 1941 |
| 2,379,342 | Cozzoli | June 26, 1945 |

FOREIGN PATENTS

| 238,394 | Germany | Sept. 23, 1911 |
| 479,075 | Great Britain | Jan. 31, 1938 |

OTHER REFERENCES

"Disinfection and Sterilization" (1936) McCullock, Page 86.

"Scientific Glass Blowing" (1949) Barr and Anhorn, Page 45.